T. I. DUFFY.
SPRING SUSPENSION.
APPLICATION FILED NOV. 1, 1915.
1,213,761.
Patented Jan. 23, 1917.
2 SHEETS—SHEET 1.
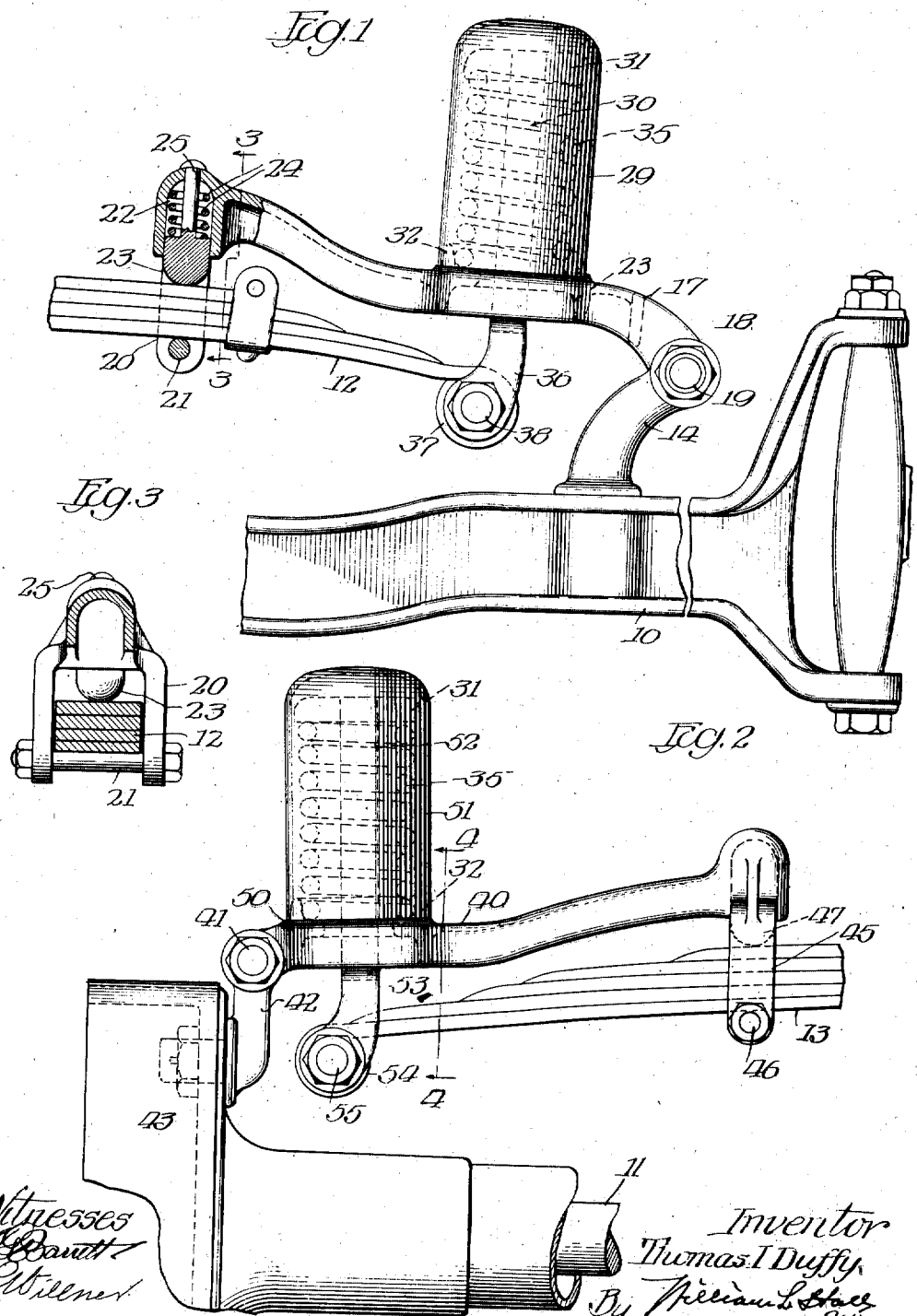
Witnesses
Inventor
Thomas I Duffy
By William L Stacy
Atty.

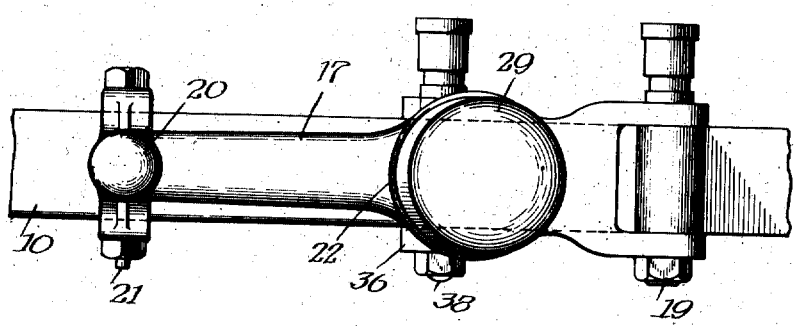
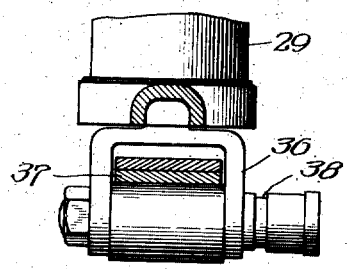
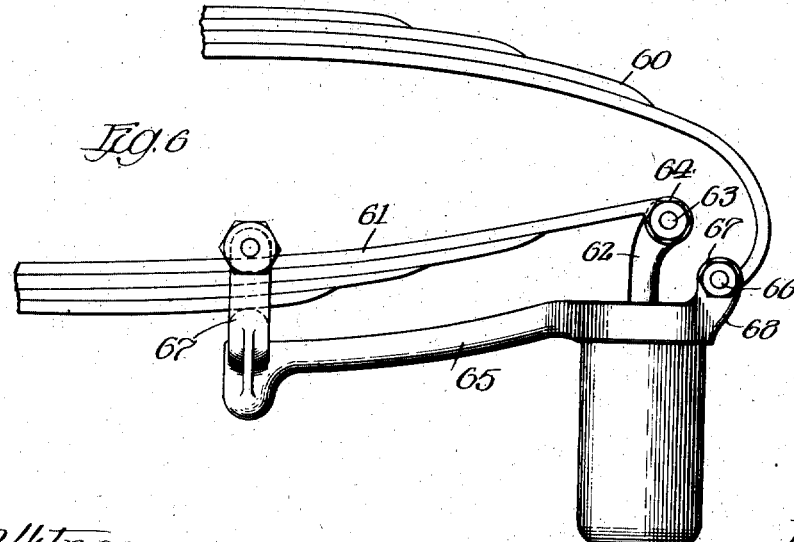

UNITED STATES PATENT OFFICE.

THOMAS I. DUFFY, OF CHICAGO, ILLINOIS.

SPRING SUSPENSION.

1,213,761.  Specification of Letters Patent.  Patented Jan. 23, 1917.

Application filed November 1, 1915. Serial No. 58,996.

*To all whom it may concern:*

Be it known that I, THOMAS I. DUFFY, a citizen of the United States, and a resident of Chicago, in the county of Cook and State of Illinois, have invented certain new and useful Improvements in Spring Suspensions; and I do hereby declare that the following is a full, clear, and exact description thereof, reference being had to the accompanying drawings, and to the characters of reference marked thereon, which form a part of this specification.

This invention relates to improvements in spring suspension for vehicles and refers more specifically to that type of spring suspension which is so constructed and arranged as to absorb minor shocks or vibrations, which are too small or too fast to be absorbed by the main or leaf spring.

The purpose of the invention is to provide a simple device which may be applied to standard springs, and when so applied, constitute means for absorbing the lighter vibrations imposed on the spring, and also for absorbing or neutralizing the rebound or recoil action of the spring.

Other objects of the invention are to improve and simplify spring suspension for vehicles, and the invention consists in the combination and arrangement of the parts shown in the drawing and described in the specification, and is pointed out in the appended claims.

I have herein shown my improved spring mounting as applied to a semi-elliptical spring of the Ford type, and also to a three-quarter or full elliptical spring, but it is to be understood that the essential principles of my invention are capable of adaptation to other types of springs.

As shown in the drawings: Figure 1 is a partial side elevation and partial section showing the adaptation of my invention to a front spring of the Ford type. Fig. 2 is a similar view showing the adaptation of my improvements to a rear spring of the Ford type. Fig. 3 is a cross section on the line 3—3 of Fig. 1. Fig. 4 is a section on line 4—4 of Fig. 2. Fig. 5 is a plan view of the device shown in Fig. 1. Fig. 6 is a fragmentary view of another form of spring showing the adaptation of my improvements thereto.

As shown in Figs. 1 and 2 of the drawings, 10 designates the front axle and 11 the rear axle of the vehicle, 12 designates the front spring and 13 the rear spring thereof, said springs being semi-elliptical and arranged longitudinally over the axles. First referring to the arrangement of the front spring mounting, 14 designates a lug or fitting which is carried by the front axle, one at each end thereof, and which, in certain standard types of spring mounting, are inclined inwardly to support the ends of the spring 12 through the medium of shackles. In adapting my improvements to the type of spring shown in Fig. 1, the fittings 14 are reversed so as to incline toward the outer ends of the axle. 17 designates a lever which is formed at its outer end with a yoke 18 which is pivoted to the upstanding lug or fitting 14 by means of a shackle bolt 19. The inner end of said lever extends inwardly over the spring 12 and is provided with a yoke 20, the downwardly turned arms of which fit over the sides of the spring 12. Said yoke arms are connected below the spring by a bolt 21 which is adapted to bear on the under side of the master leaf of the spring 12. In order to prevent the yoke rattling on the spring, said yoke is provided with a recess 22 to receive a plunger 23 which bears upon the upper leaf of the spring 12 and is pressed thereon through the action of a spiral spring 24 that is arranged within the chamber between said plunger and the upper wall of the chamber, and surrounds said stem 25. This construction provides means for maintaining a firm clamping pressure of the yoke on the spring, regardless of the slight changes in the dimensions of the spring with which the yoke contacts, due to endwise movement of the spring relatively to the yoke. The lever 17 is provided between its ends with a ring shaped support 28 which receives the lower open edge of the casing 29 of a shock absorbing device. Said shock absorbing device may be made of any suitable type. As herein shown, it comprises, in combination with said casing, a stem or rod 30 provided at its upper end with a head or follower 31, between which and the lower wall 32 of the casing, is interposed a spiral compression spring 33. The said rod or stem 30 is provided at its lower end with a yoke 36 which is pivoted to the eye 37 of the spring 12 by a shackle bolt 38.

With the construction described it will be noted that the weight of the load of the vehicle is transferred to the front axle 10 through the medium of both the main spring 12 and the auxiliary or shock absorbing spring 35 and that the arrangement is such that the lesser loads and minor shocks or vibrations thrown upon the spring suspension are taken care of and absorbed by said auxiliary spring 35, while the heavier loads and the larger vibrations are transmitted through the auxiliary spring to the main spring 12.

The shackle bolt 19 constitutes a fixed pivot for the lever 17 while the yoke connection 20 at the inner end of the lever with the spring 12 is a floating connection and the end of the spring 12 is suspended at a distance from its connection with the yoke 20 by the auxiliary spring 35. It will, furthermore, be observed that when a full load is thrown on the spring suspension and the main spring 12 flexes or straightens, the spring held clamping yoke 20 shifts relatively to the longitudinal axis of the spring 12, due to the swinging movement of said lever 17, so that when the load is released, the frictional engagement of the yoke with the spring retards the rebound or recoil action of the spring and serves to absorb or neutralize the recoil action of the main spring and to thereby render the riding qualities of the spring smooth and even. Furthermore, the movement of the lever 17 relatively to the fixed pivot 19 thereof, its floating engagement with the spring 12 and the connection of the main spring with the auxiliary spring is such as to maintain the plunger or stem 30 in proper axial relation to the casing so as to thereby avoid binding of the plunger upon its guides and consequent irregular action. The arrangement shown therefore produces an exceedingly smooth spring action.

In the adaptation of my improvements to the rear spring, the lever 40, which takes the place of the lever 17 associated with the front spring, is connected by a pivot or shackle bolt 41 with an upstanding fitting 42 which is fixed to the adjacent brake case by means of a screw threaded lug 43 in the manner indicated in Fig. 2. The inner end of the lever is provided with a yoke 45, the arms of which fit downwardly along side of the spring and are connected at their ends by a pin or bolt 46 which bears on the lower face of the master leaf of the spring. The said yoke is also provided with a spring pressed plunger 47, which acts in the manner of the plunger 23 before referred to to maintain a firm clamping engagement of the yoke on the spring for the purposes hereinbefore set forth. Said lever 40 is provided between its ends with a ringlike support 50 to receive the lower end of the casing 51 of an auxiliary spring or shock absorbing device, the plunger 52 of which is provided with a yoke 53 that is pivoted to the spring eye 54 of the rear spring 13 by means of a shackle bolt 55 which extends through said yoke 53 and through said eye.

The operation of the device thus described is essentially the same as the device shown in connection with the front spring, the structural difference being made necessary only by reason of the different manner of fastening the springs to the axle. In Fig. 6 I have shown my improvements applied to a full or three quarter elliptical spring consisting of an upper scroll member 60 and a lower member 61. In this arrangement the yoke 62 of the plunger of the auxiliary spring or shock absorber is connected by a shackle bolt 63 to the eye 64 of the lower spring member 61. One end of the lever 65, corresponding to the lever 17 shown in Fig. 1, is pivoted by a shackle bolt 66 to the eye 67 of the upper member 60 of the spring. The other or inner end of the lever 65 is connected to the lower member 61 of the spring by means of a clamp yoke 67 made essentially like the clamp yokes shown in the figures hereinbefore described. The operation of the spring suspension as applied to this type of spring is essentially the same as that applied to the type of spring shown in Figs. 1 and 2, the auxiliary spring being relied upon to take the lighter loads and absorb the lighter vibrations brought upon the spring and the main spring member being relied upon to take the heavier loads and vibrations. In the construction shown in Fig. 6, the outer end of the lever which carries the auxiliary or absorbing spring device terminates closely adjacent to the casing for the auxiliary spring so that the improved device may be attached to standard spring arrangements without variations of the spring dimensions.

As before stated it is to be understood that the essential principles of my improvements may be adapted to other types of spring suspensions used in connection with other means of attaching the springs to the chassis within the spirit and scope of the claims hereto appended. In the employment of my invention with a spring mounting which embraces a scroll body or dumb iron similar to the upper leaf 60 of the suspension shown in Fig. 6, the auxiliary or shock absorbing device may be installed in the same general manner as shown in said figure.

In the constructions shown and suggested, the swinging lever of the spring suspension (17, 40 and 65) is hinged to a relatively fixed part, as the fittings 14, 42 shown in Figs. 1 and 2, and the lug 68 shown in Fig. 6, while the other end thereof is movably connected, by a clamping yoke, to the spring member with which it is associated a distance from the inside of the end of said spring member and the end of said spring member is pivotally connected to the auxiliary spring. It will be understood that the clamping action on the spring due to the clamping yokes described, is not sufficient in the normal positions of the parts of the spring suspension to prevent fairly easy movement of the main spring relatively to the yoke, the spring 24 and plunger 23 being relied upon mainly as anti-rattling devices. Therefore the frictional engagement of the clamping parts does not substantially restrict free movement of the parts so that the lesser loads and minor vibrations are efficiently transmitted to and absorbed by the auxiliary spring. The invention is therefore not limited to the details illustrated except as hereinafter made the subject of specific claims or as imposed by the prior art. Furthermore it is the intent to claim all of inherent novelty shown in the drawings and described in the specification.

I claim as my invention:

1. A spring suspension for vehicles comprising, in combination with the main spring and its support, of a lever pivoted to said support and movably engaging the main spring between the ends of the latter, and an auxiliary spring carried between the ends of the lever and connected to the end of the main spring.

2. A spring suspension for vehicles comprising, in combination with the main spring and its support, of a lever pivoted to said support and movably engaging the main spring between the ends of the latter, and an auxiliary spring carried between the ends of the lever and pivotally connected to the end of the main spring.

3. In a spring suspension for vehicles, a main spring, a lever pivoted at one end to a relatively fixed support, a clamping yoke at the other end of the lever movably engaging the spring inside its end, an auxiliary spring supported on the lever between the ends of the latter and a plunger connected to the auxiliary spring and pivoted to the end of the main spring.

4. In a spring suspension for vehicles, a main spring provided at one end with an eye, a support for the spring, a lever pivoted at one end thereof to said support and movably engaging said spring a distance inside the end of the latter, an auxiliary spring supported on said lever at its pivot end and a plunger connected to said spring and pivoted to said eye of the main spring.

5. In a spring suspension for vehicles, a main spring, a lever pivoted at one end thereof to a relatively fixed support, a clamping yoke carried by the other end of the lever, the arms of which engage over the sides of said spring with a cross pin connecting the ends of said arms whereby the lever may be removably attached to the main spring, an auxiliary spring supported on the lever at its pivot end and a plunger connected to the auxiliary spring and pivoted to the end of the main spring.

6. In a spring suspension for vehicles, a main spring, a lever pivoted at one end to a relatively fixed support, a clamping yoke at the other end of the lever movably engaging the spring, said lever being provided between its ends with a ring-like frame, a casing supported on the ring-like frame, a plunger slidable in the casing and provided at one end with a head, a spring between the head and the lower end of the casing and means to connect the plunger to the end of the main spring.

In testimony, that I claim the foregoing as my invention I affix my signature in the presence of two witnesses, this 28th day of September A. D. 1915.

THOMAS I. DUFFY.

Witnesses:
RUTH E. ZETTERVALL,
REBECCA WILLNER.